US 9,985,303 B2

(12) United States Patent
Cai et al.

(10) Patent No.: US 9,985,303 B2
(45) Date of Patent: May 29, 2018

(54) VALIDATION AND CORRECTION OF GEN 2 ANODE H2 CONCENTRATION ESTIMATION

(71) Applicant: GM GLOBAL TECHNOLOGY OPERATIONS LLC, Detroit, MI (US)

(72) Inventors: Jun Cai, Fairport, NY (US); Stephen D. Pace, Troy, MI (US); Sergio E. Garcia, Commerce Township, MI (US); Elizabeth Dicocco, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 299 days.

(21) Appl. No.: 14/863,347

(22) Filed: Sep. 23, 2015

(65) Prior Publication Data

US 2017/0084941 A1    Mar. 23, 2017

(51) Int. Cl.
*H01M 8/04* (2016.01)
*H01M 8/04089* (2016.01)
*H01M 8/04298* (2016.01)
*H01M 8/04223* (2016.01)
*H01M 8/0444* (2016.01)
*H01M 8/04664* (2016.01)
*H01M 8/1018* (2016.01)

(52) U.S. Cl.
CPC ... *H01M 8/04089* (2013.01); *H01M 8/04231* (2013.01); *H01M 8/04298* (2013.01); *H01M 8/04305* (2013.01); *H01M 8/04447* (2013.01); *H01M 8/04679* (2013.01); *H01M 2008/1095* (2013.01); *H01M 2250/20* (2013.01); *Y02T 90/32* (2013.01)

(58) Field of Classification Search
CPC ......... H01M 8/04231; H01M 8/04298; H01M 8/04305; H01M 8/04447
See application file for complete search history.

(56) References Cited

U.S. PATENT DOCUMENTS

| 8,195,407 | B2 | 6/2012 | Salvador et al. | |
| 8,722,263 | B2 | 5/2014 | Cai et al. | |
| 2011/0244348 | A1* | 10/2011 | Cai | H01M 8/04097 429/429 |
| 2013/0040211 | A1* | 2/2013 | Di Fiore | H01M 8/0662 429/410 |

* cited by examiner

*Primary Examiner* — Ladan Mohaddes
(74) *Attorney, Agent, or Firm* — John A. Miller; Shumaker, Loop & Kendrick, LLP

(57) ABSTRACT

A system and method for determining whether a concentration estimation value of hydrogen gas in an anode subsystem of a fuel cell system is within a predetermined threshold of a valid hydrogen gas concentration, and if not, correcting the estimation value. The method includes providing a hydrogen gas concentration sensor value from a virtual sensor and calculating the hydrogen gas concentration estimation value using a gas concentration estimation model. The method also includes determining if a difference between the estimation value and the sensor value is greater than at least one threshold, and if so, causing an extended bleed event to occur that bleeds an anode exhaust gas to force the estimation value to be closer to the sensor value. The method also includes setting a diagnostic if multiple extended bleeds do not cause the estimation value and the sensor value to converge.

20 Claims, 2 Drawing Sheets

VALIDATION AND CORRECTION OF GEN 2 ANODE H2 CONCENTRATION ESTIMATION

BACKGROUND OF THE INVENTION

Field of the Invention

This invention relates generally to a system and method for validating an estimation of hydrogen gas in an anode of a fuel stack and, more particularly, to a system and method for validating an estimation of hydrogen gas in an anode of a fuel cell stack and correcting the estimation if an error is identified, where the method includes comparing a measurement from a hydrogen gas virtual sensor to the estimation of the hydrogen gas that is determined using a gas concentration estimation model.

Discussion of the Related Art

A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The electrons from the anode cannot pass through the electrolyte, and thus are directed through a load to perform work before being sent to the cathode. Proton exchange membrane fuel cells (PEMFC) are a popular fuel cell type for vehicles, and generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer, where the catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. A fuel cell stack typically includes a series of flow field or bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Many fuel cell system control algorithms require knowing the concentration of hydrogen gas in the anode sub-system of the fuel cell system for various purposes, such as maintaining fuel cell stack stability, promoting a healthy start-up/shutdown sequence of the system, and initiating a hydrogen gas injection event to maintain hydrogen in the anode side during system off-time. It is possible to provide a gas concentration sensor at a strategic location in the fuel cell system, such as the output of the anode, to measure the concentration of the particular gas, such as hydrogen. However, in order for these types of sensors to provide an accurate estimation of the gas in the hot and wet environment of a fuel cell system, the sensors are very expensive, and still are not fully reliable, thus rendering them ineffective for automotive fuel cell system applications.

The MEAs in the fuel cells are permeable and thus allow nitrogen in the air from the cathode side of the stack to permeate through and collect in the anode side of the stack, often referred to as nitrogen cross-over. Even though the anode side pressure may be slightly higher than the cathode side pressure, cathode side partial pressures will cause air to permeate through the membrane. Nitrogen in the anode side of the fuel cell stack dilutes the hydrogen such that if the nitrogen concentration increases above a certain percentage, such as 50%, fuel cells in the stack may become starved of hydrogen. If a fuel cell becomes hydrogen starved, the fuel cell stack will fail to produce adequate electrical power and may suffer damage to the electrodes in the fuel cell stack. Thus, it is known in the art to provide a bleed valve in the anode exhaust gas output line of the fuel cell stack to remove nitrogen from the anode side of the stack. The fuel cell system control algorithms will identify a desirable minimum hydrogen gas concentration in the anode, and cause the bleed valve to open when the gas concentration falls below that threshold, where the threshold is based on stack stability.

It is known in the art to estimate the molar fraction of nitrogen and other gases in the anode side of a fuel cell stack using a model to determine when to perform the bleed of the anode side or anode sub-system. For example, gas concentration estimation (GCE) models are known for estimating hydrogen, nitrogen, oxygen, water vapor, etc. in various volumes of a fuel cell system, such as the anode flow-field, anode plumbing, cathode flow-field, cathode header and plumbing, etc. U.S. Pat. No. 8,195,407 issued Jun. 5, 2012 to Salvador et al., assigned to the assignee of this invention and herein incorporated by reference, describes one exemplary GCE model for this purpose.

It has been shown that these types of GCE models are susceptible to a number of operating conditions of the fuel cell system that can cause the GCE model to provide a relatively inaccurate estimation of the particular gas. Additionally, component failures and degradation of the components in the fuel cell system, such as the fuel cell membrane, may also cause errors in the model estimation. If the anode nitrogen molar fraction estimation is significantly higher than the actual nitrogen molar fraction, the fuel cell system will vent or bleed more anode gas than is necessary, i.e., will waste hydrogen fuel. If the anode nitrogen molar fraction estimation is significantly lower than the actual nitrogen molar fraction, the system will not vent enough anode gas and may starve the fuel cells of reactants, which may damage the electrodes in the fuel cell stack. In addition, current fuel cell system processes do not allow for correction of the hydrogen gas estimation if it is determined to be inaccurate.

SUMMARY OF THE INVENTION

The present invention discloses and describes a system and method for determining whether a concentration estimation value of hydrogen gas in an anode sub-system of a fuel cell system is within a predetermined threshold of a valid hydrogen gas concentration, and if not, correcting the estimation value. The method includes providing a hydrogen gas concentration sensor value from a virtual sensor and calculating a hydrogen gas concentration estimation value using a gas concentration estimation model. The method also includes determining if a difference between the estimation value and the sensor value is greater than at least one threshold, and if so, causing an extended bleed event to occur that bleeds an anode exhaust gas to force the estimation value to be closer to the sensor value. The method also includes setting a diagnostic if multiple extended bleeds do not cause the estimation value and the sensor value to converge.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining whether an estimation of hydrogen gas in an anode sub-system of a fuel cell stack is accurate is merely exemplary in nature, and is in no way intended to limit the invention or its applications or uses.

Figure 1:
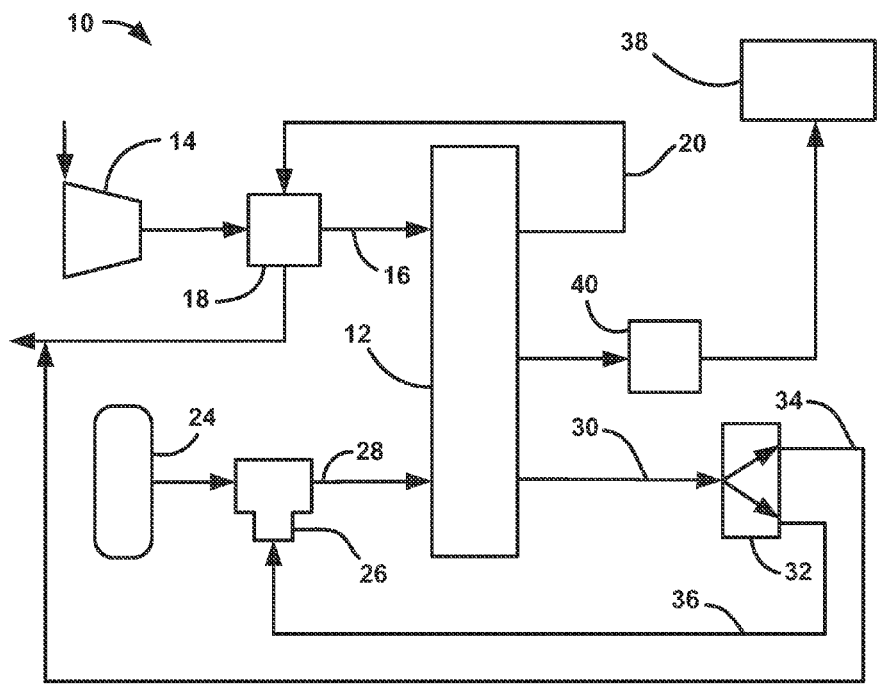
FIG. 1 is a simplified schematic block diagram of a fuel cell system.

FIG. 1 is a schematic block diagram of a fuel cell system 10 including a fuel cell stack 12. A compressor 14 provides an airflow to the cathode side of the fuel cell stack 12 on a cathode input line 16 through a water vapor transfer (WVT) unit 18 that humidifies the cathode input air. A cathode exhaust gas is output from the stack 12 on a cathode exhaust gas line 20 that directs the cathode exhaust gas to the WVT unit 18 to provide the water vapor to humidify the cathode input air. The fuel cell system 10 also includes a source 24 of hydrogen fuel, typically a high pressure tank, that provides hydrogen gas to an injector 26 that injects a controlled amount of the hydrogen gas to the anode side of the fuel cell stack 12 on an anode input line 28. Although not specifically shown, one skilled in the art would understand that various pressure regulators, control valves, shut-off valves, etc. would be provided to supply the high pressure hydrogen gas from the source 24 at a pressure suitable for the injector 26. The injector 26 can be any injector suitable for the purposes discussed herein. One example is an injector/ejector as described in U.S. Pat. No. 7,320,840, titled, Combination of Injector/Ejector for Fuel Cell Systems, issued Jan. 22, 2008, assigned to the assignee of this application and herein incorporated by reference.

An anode effluent output gas is output from the anode side of the fuel cell stack 12 on an anode output line 30, which is provided to a bleed valve 32. As discussed above, nitrogen cross-over from the cathode side of the fuel cell stack 12 dilutes the hydrogen gas in the anode side of the stack 12, thereby affecting fuel cell stack performance. Therefore, it is necessary to periodically bleed the anode effluent gas from the anode sub-system to reduce the amount of nitrogen in the anode sub-system. When the system 10 is operating in a normal non-bleed mode, the bleed valve 32 is in a position where the anode effluent gas is provided to a recirculation line 36 that recirculates the anode gas to the injector 26 to operate it as an ejector and provide recirculated hydrogen gas back to the anode input of the stack 12. When a bleed is commanded to reduce the nitrogen in the anode side of the stack 12, the bleed valve 32 is positioned to direct the anode effluent gas to a by-pass line 34 that combines the anode effluent gas with the cathode exhaust gas on the line 20, where the hydrogen gas is diluted to a level suitable for the environment.

The system 10 also includes a virtual hydrogen gas sensor 40 that measures the hydrogen gas concentration in the anode sub-system of the fuel cell system 10. The measured hydrogen gas concentration is provided to a controller 38 that performs the gas concentration comparison and estimations discussed herein. As will be discussed in detail below, the present invention proposes a system and method for determining whether a gas concentration estimation (GCE) model is providing an accurate estimation of the hydrogen gas concentration in the anode sub-system of the fuel cell system 10 by comparing the estimation to a measurement value from the virtual hydrogen gas sensor 40, and if the estimation and the measurement value deviate beyond a predetermined threshold, then the system and method command a bleed to correct the hydrogen gas estimation. The system and method also set a counter and generate a diagnostic trouble code if the number of deviation events exceeds a predetermined threshold.

The know GCE model determines the hydrogen gas concentration within the anode and cathode sub-systems during all possible fuel cell system states. To accomplish this, the model needs to change its functionality based on the fuel cell system operating mode. The GCE model adjusts the anode hydrogen gas concentration based on the estimated flow of the anode exhaust that is leaving the anode sub-system through an output valve. The model also accounts for the electro-chemical hydrogen consumption and gas permeation through the fuel cell membranes that can change due to the age of the fuel cell stack materials. The GCE model converts the hydrogen gas concentration to a mole fraction of each individual gas within the anode and cathode flow streams and can be used to analyze the model estimation accuracy verses measurement information from a hydrogen concentration sensor. The gas concentration estimation is completely model based and does not include direct or indirect feedback information making it an open loop model with an integrating error potential.

Figure 2:
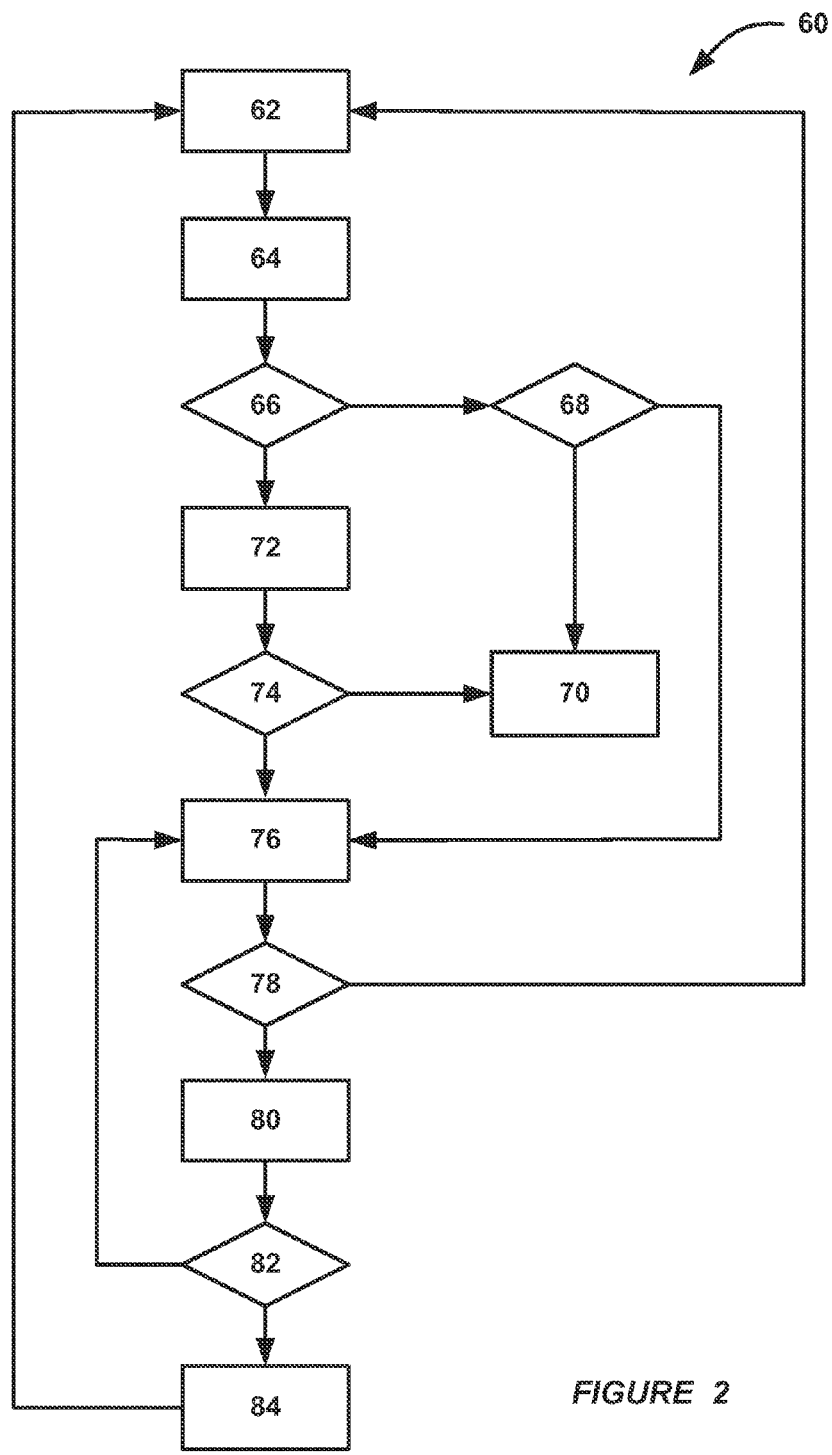
FIG. 2 is a flow chart diagram showing a process for determining whether an estimation of hydrogen gas in an anode sub-system of a fuel cell system based on a gas concentration estimation model is accurate, and if not, correcting the estimation.

FIG. 2 is a flow chart diagram 60 showing a process performed by algorithms in the controller 38 for determining whether a gas concentration estimation value that identifies an estimation of hydrogen gas in the anode sub-system of the fuel cell system 10 using a GCE model is accurate, and if not, correcting the estimation value. The algorithm begins at box 62 and obtains a hydrogen gas measurement value from a hydrogen gas concentration sensor at box 64. As discussed above, hydrogen gas concentration sensors are generally not provided in fuel cell systems on a vehicle because the sensors are typically costly and unreliable as a result of the wet environment that the fuel cell system operates in. The hydrogen concentration sensor referred to herein may be the virtual sensor 40 that obtains a hydrogen gas concentration measurement value by other known processes or algorithms separate from the GCE model, and can be an actual hydrogen gas concentration sensor online or offline.

In one embodiment, the virtual sensor 40 measures the hydrogen gas concentration based on voltage measurements of the fuel cell stack 12 and is provided at each bleed event.

Thus, the measurement provided by the virtual sensor 40 may not always be available as a valid measurement. Therefore, the algorithm determines, based on the operating conditions of the fuel cell system 10, whether the virtual sensor 40 is providing a valid measurement at decision diamond 66, and if it is not a valid measurement, the algorithm determines whether the time that has elapsed from a previous hydrogen gas concentration estimation correction is greater than a predetermined threshold, such as three seconds, at decision diamond 68. As mentioned, the algorithm performs a comparison between the available virtual sensor measurement value and the hydrogen gas concentration estimation value calculated by the GCE model, and if those values are different beyond a predetermined threshold, then the algorithm corrects the concentration estimation value provide by the model. Thus, the time elapsed at the decision diamond 68 is the time from the last time that the estimation value was corrected. If the time elapsed is not greater than the threshold at the decision diamond 68, then the algorithm takes no action at box 70.

If the virtual sensor measurement value is valid at the decision diamond 66, then the algorithm compares the virtual sensor measurement value with the hydrogen gas concentration estimation value calculated by the GCE model at box 72, and determines whether the difference between the measurement value and the estimation value is greater than a first threshold or the difference between the estimation value and the measurement value is greater than a second threshold at decision diamond 74, where the first second thresholds can be different. It is important for the algorithm to know whether the estimation of the hydrogen gas concentration is greater than or less than the measured concentration, which gives a determination of whether there is too much hydrogen gas or too little hydrogen gas in the anode sub-system so as to adjust the bleed event accordingly.

If the sensor measurement value is not greater than the GCE model estimation value by the first threshold or the GCE model estimation value is not greater than the sensor measurement value by the second threshold at the decision diamond 74, then the algorithm takes no action at the box 70. If the time elapsed from the last correction at the decision diamond 68, or the sensor measurement value is greater than the estimation value by the first threshold at the decision diamond 74, or the estimation value is greater than the sensor measurement value by the second threshold at the decision diamond 74, then the algorithm commands an extended reactive bleed by the bleed valve 32 to force the model estimation value to merge with the sensor measurement value at box 76. At the end of the extended bleed at the box 76, the algorithm will then again determine the difference between the sensor value and the estimation value the same as it did above at decision diamond 74, and if either of these differences is below the respective threshold, the algorithm will return to the box 62 to begin again. If the difference between the measurement value and the model estimation value are outside of the thresholds at the decision diamond 78, then a fault counter is incremented by one at box 80. This part of the algorithm is determining whether there is a more serious problem with the fuel cell system 10, such as a hydrogen leak, where the reactive bleed does not cause the model estimation value to become more accurate.

Once the counter is incremented by one at the box 80, the algorithm determines whether the total count value is greater than a predetermined count threshold, such as four, at decision diamond 82, and if not, returns to the box 76 to perform another extended bleed to again attempt to correct the GCE model estimation value. If the count value has reached the count threshold at the decision diamond 82, meaning there is some other issue causing the model to indicate an improper hydrogen estimation, the algorithm will report a diagnostic trouble code and clear the counter at box 84, and then return to the beginning of the algorithm.

Figure 3:
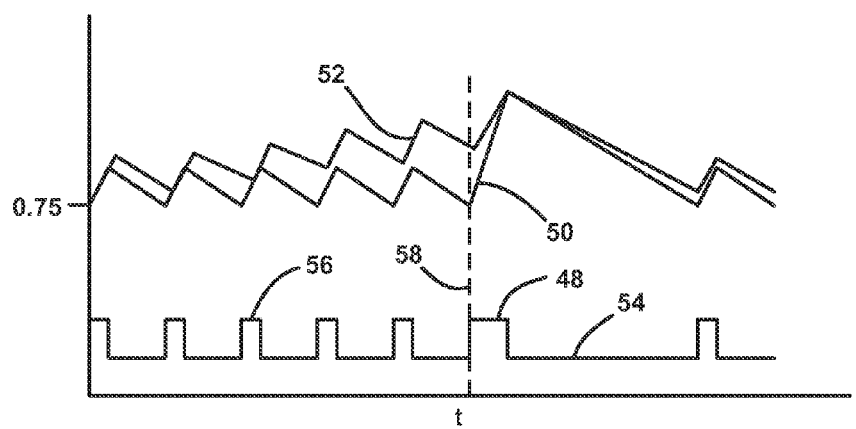
FIG. 3 is a graph with time on the horizontal axis showing both an estimated hydrogen gas concentration in an anode of the fuel cell stack, an actual hydrogen gas concentration in the anode, and bleed valve opening events.

FIG. 3 shows a graphical representation of the process discussed above, where time is on the horizontal axis. Graph line 50 represents the hydrogen gas concentration estimation value as determined by the GCE model and graph line 52 represents the hydrogen gas concentration measurement value as provided by the virtual sensor 40. The bleeds of the bleed valve 32 are initiated each time the hydrogen gas concentration estimation value falls below 75% in this non-limiting embodiment. This is represented by line 54 that illustrates when the bleed events occur by pulses 56, where each pulse 56 represents the bleed valve 32 being opened. Thus, as shown, each time the model indicates that the hydrogen gas concentration has fallen to 75%, the bleed algorithm will open the bleed valve 32, where the concentration of the hydrogen gas in the anode increases as a result of the bleed. However, the actual hydrogen gas concentration is shown by the line 52, where the bleed events are actually occurring when the hydrogen concentration is above 75%, thus wasting fuel. Once the difference between the model estimation value and the virtual sensor measurement increases above a certain error, represented here at time 58, the algorithm discussed above will cause an extended remedial bleed to occur as represented by pulse 48 so that the model estimation value will move to the virtual sensor measurement value during the bleed event.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for correcting a gas concentration estimation value that is an estimate of hydrogen gas in an anode of a fuel cell stack, said method comprising:
   providing a hydrogen gas concentration sensor value from a virtual sensor, where the virtual sensor determines the hydrogen gas concentration sensor value by measuring at least one fuel cell parameter including fuel cell stack voltage;
   calculating the hydrogen gas concentration estimation value using a pre-existing gas concentration estimation model, where the estimation model uses an estimation of anode nitrogen gas in an ideal gas law calculation to determine the hydrogen gas concentration estimation value;

determining if a difference between the hydrogen gas concentration estimation value and the hydrogen gas concentration sensor value is greater than at least one threshold; and causing an extended bleed event to occur that bleeds an anode exhaust gas to force the hydrogen gas concentration estimation value to be closer to the hydrogen gas concentration sensor value if the difference between the hydrogen gas concentration estimation value and the hydrogen gas concentration sensor value is greater than the at least one threshold.

2. The method according to claim 1 further comprising repeating determining if a difference between the hydrogen gas concentration estimation value and the hydrogen gas concentration sensor value is greater than the at least one threshold after the extended bleed event, and if so, incrementing a counter.

3. The method according to claim 2 further comprising determining whether a count value in the counter is greater than a count threshold after the counter has been incremented, and if not, causing the extended bleed event to occur again.

4. The method according to claim 3 further comprising reporting a diagnostic issue if the count value is greater than the count threshold.

5. The method according to claim 1 wherein determining whether a difference between the hydrogen gas concentration estimation value and the hydrogen gas concentration sensor value is greater than at least one threshold includes determining whether the hydrogen gas concentration sensor value minus the hydrogen gas concentration estimation value is greater than a first threshold and determining whether the hydrogen gas concentration estimation value minus the hydrogen gas concentration sensor value is greater than a second threshold, where the first and second thresholds are different.

6. The method according to claim 1 further comprising determining whether the hydrogen gas concentration sensor value is valid before determining if a difference between the hydrogen gas concentration estimation value and the hydrogen gas concentration sensor value is greater than at least one threshold.

7. The method according to claim 6 further comprising determining whether an elapsed time from a previous extended bleed event is greater than a predetermined threshold if the hydrogen gas concentration sensor value is not valid.

8. The method according to claim 7 further comprising causing the extended bleed event to occur if the elapsed time is greater than the threshold.

9. A method for correcting a gas concentration estimation value that is an estimate of hydrogen gas in an anode of a fuel cell stack, said method comprising:

providing a hydrogen gas concentration sensor value from a virtual sensor;

calculating the hydrogen gas concentration estimation value using a pre-existing gas concentration estimation model, where the estimation model uses an estimation of anode nitrogen gas in an ideal gas law calculation to determine the hydrogen gas concentration estimation value;

determining whether the hydrogen gas concentration sensor value minus the hydrogen gas concentration estimation value is greater than a first threshold and determining whether the hydrogen gas concentration estimation value minus the hydrogen gas concentration sensor value is greater than a second threshold, where the first and second thresholds are different;

causing an extended bleed event to occur that bleeds an anode exhaust gas to force the hydrogen gas concentration estimation value to be closer to the hydrogen gas concentration sensor value if the hydrogen gas concentration sensor value minus the hydrogen gas concentration estimation value is greater than the first threshold or the hydrogen gas concentration estimation value minus the hydrogen gas concentration sensor value is greater than the second threshold;

repeating determining whether the hydrogen gas concentration sensor value minus the hydrogen gas concentration estimation value is greater than the first threshold and determining whether the hydrogen gas concentration estimation value minus the hydrogen gas concentration sensor value is greater than the second threshold after the extended bleed event, and if so, incrementing a counter;

determining whether a count value of the counter is greater than a count threshold after the counter has been incremented, and if not, causing the extended bleed event to occur again; and reporting a diagnostic issue if the count value is greater than the count threshold.

10. The method according to claim 9 further comprising determining whether the hydrogen gas concentration sensor value is valid before determining whether the hydrogen gas concentration sensor value minus the hydrogen gas concentration estimation value is greater than a first threshold and determining whether the hydrogen gas concentration estimation value minus the hydrogen gas concentration sensor value is greater than a second threshold.

11. The method according to claim 10 further comprising determining whether an elapsed time from a previous extended bleed event is greater than a predetermined threshold if the hydrogen gas concentration sensor value is not valid.

12. The method according to claim 11 further comprising causing the extended bleed event to occur if the elapsed time is greater than the threshold.

13. A system for correcting a gas concentration estimation value that is an estimate of hydrogen gas in an anode of a fuel cell stack, said method comprising:

a virtual sensor for providing a hydrogen gas concentration sensor value, where the virtual sensor determines the hydrogen gas concentration sensor value by measuring at least one fuel cell parameter including fuel cell stack voltage; and a controller including a processor configured with an algorithm which performs steps including:

calculating the hydrogen gas concentration estimation value using a pre-existing gas concentration estimation model, where the estimation model uses an estimation of anode nitrogen gas in an ideal gas law calculation to determine the hydrogen gas concentration estimation value;

determining if a difference between the hydrogen gas concentration estimation value and the hydrogen gas concentration sensor value is greater than at least one threshold; and causing an extended bleed event to occur that bleeds an anode exhaust gas to force the hydrogen gas concentration estimation value to be closer to the hydrogen gas concentration sensor value if the difference between the hydrogen gas concentration estimation value and the hydrogen gas concentration sensor value is greater than the at least one threshold.

14. The system according to claim 13 further comprising, in the algorithm, repeating determining if a difference between the hydrogen gas concentration estimation value and the hydrogen gas concentration sensor value is greater than the at least one threshold, and if so, incrementing a counter.

15. The system according to claim 14 further comprising, in the algorithm, determining whether a count value of the counter is greater than a count threshold after the counter has been incremented, and if not, causing the extended bleed event to occur again.

16. The system according to claim 15 further comprising, in the algorithm, reporting a diagnostic issue if the count value is greater than the counter threshold.

17. The system according to claim 13 wherein determining whether a difference between the hydrogen gas concentration estimation value and the hydrogen gas concentration sensor value is greater than at least one threshold includes determining whether the hydrogen gas concentration sensor value minus the hydrogen gas concentration estimation value is greater than a first threshold and determining whether the hydrogen gas concentration estimation value minus the hydrogen gas concentration sensor value is greater than a second threshold, where the first and second thresholds are different.

18. The system according to claim 13 further comprising, in the algorithm, determining whether the hydrogen gas concentration sensor value is valid before determining if a difference between the hydrogen gas concentration estimation value and the hydrogen gas concentration sensor value is greater than at least one threshold.

19. The system according to claim 18 further comprising, in the algorithm, determining whether an elapsed time from a previous extended bleed event is greater than a predetermined threshold if the hydrogen gas concentration sensor value is not valid.

20. The system according to claim 19 further comprising, in the algorithm, causing the extended bleed event to occur if the elapsed time is greater than the threshold.

* * * * *